May 12, 1925.

D. COLE 1,537,748

INTERNAL COMBUSTION ENGINE

Filed June 28, 1919   3 Sheets-Sheet 1

Witnesses:
W. T. Kilroy
Harry R. LeMaitre

Inventor:
Don Cole
Brown, Boettcher & Dienner
By
Attys.

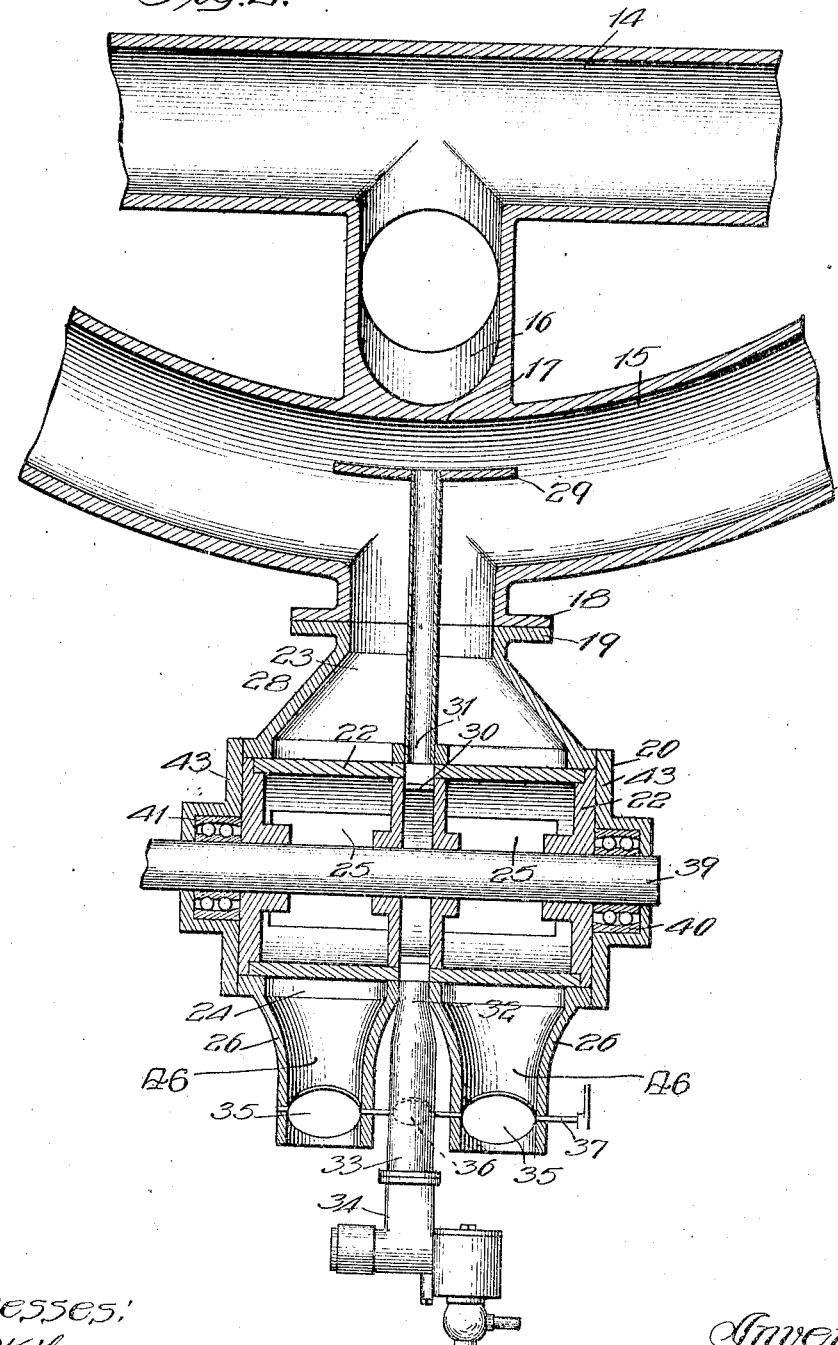

May 12, 1925.
D. COLE
1,537,748
INTERNAL COMBUSTION ENGINE
Filed June 28, 1919    3 Sheets-Sheet 3
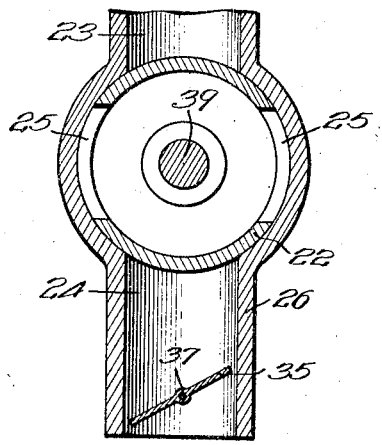
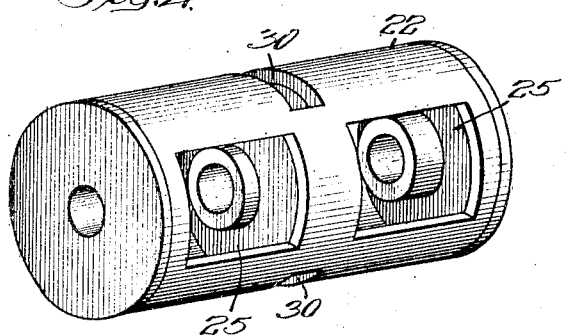
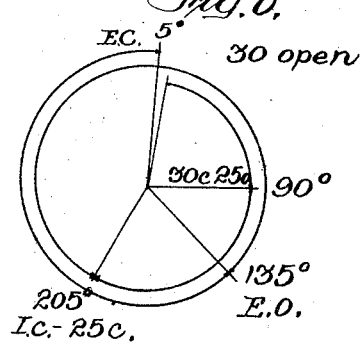
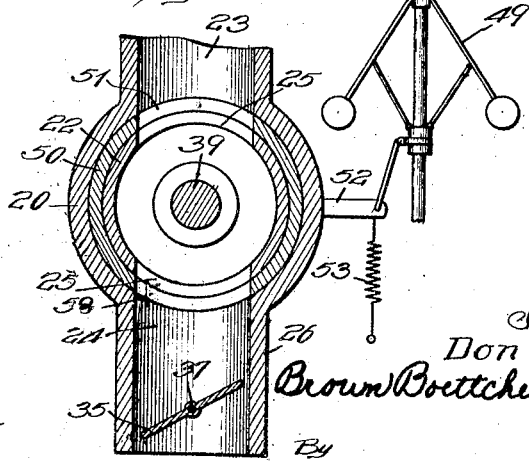

Patented May 12, 1925.

1,537,748

UNITED STATES PATENT OFFICE.

DON COLE, OF CHICAGO, ILLINOIS, ASSIGNOR OF ONE-HALF TO JOHN A. DIENNER, OF CHICAGO, ILLINOIS.

INTERNAL-COMBUSTION ENGINE.

Application filed June 28, 1919. Serial No. 307,292.

*To all whom it may concern:*

Be it known that I, DON COLE, a citizen of the United States, residing at Chicago, in the county of Cook and State of Illinois, have invented a certain new and useful Improvement in Internal-Combustion Engines, of which the following is a full, clear, concise, and exact description, reference being had to the accompanying drawings, forming a part of this specification.

My invention relates to internal combustion engines and particularly of the type disclosed in my co-pending applications characterized by the employment of reduced pressure and high velocity for breaking up fuel such as kerosene or the modern forms of gasoline, which do not readily vaporize.

According to my present invention, I provide the intake pipe of the engine with an atmosphere connection and a carburetor connection and control these connections synchronously with the operation of the engine to subject the fuel to reduced pressure and high air velocity and thereafter admit sufficient air to dilute the mixture to the proper degree. The main body of air is introduced separately from the fuel bearing air and the main body of air is not brought into contact with the hot spot or heated surface and the efficiency of the engine is maintained at a high value. The air connection and the carburetor connection may be controlled by throttle valves jointly operated so that the speed of the engine may be governed without varying the mixture.

I also provide means for controlling the degree of port opening of the governing valve so that on lower speeds of the engine the ports will be more nearly closed to insure that a relatively high suction will be imposed upon the fuel discharged in the intake pipe so that an effective atomization and diffusion of the liquid fuel is always caused.

In order to acquaint those skilled in the art with the manner of constructing and practicing my invention I shall now describe in connection with the accompanying drawings an embodiment of the invention.

Figure 2 is a fragmentary sectional view taken on the line 2—2 of Figure 1;

Figure 3 is a sectional view thru the rotary valve and atmosphere connection;

Figure 4 is a detailed isometric view of the automatic governing valve;

Figure 5 is a view similar to Figure 2 showing the preferred embodiment of the invention employing a speed controlled governor for controlling the extent of valve opening so that a high suction will always be created in the intake pipe; and Figure 6 is a valve timing diagram.

Figure 1:
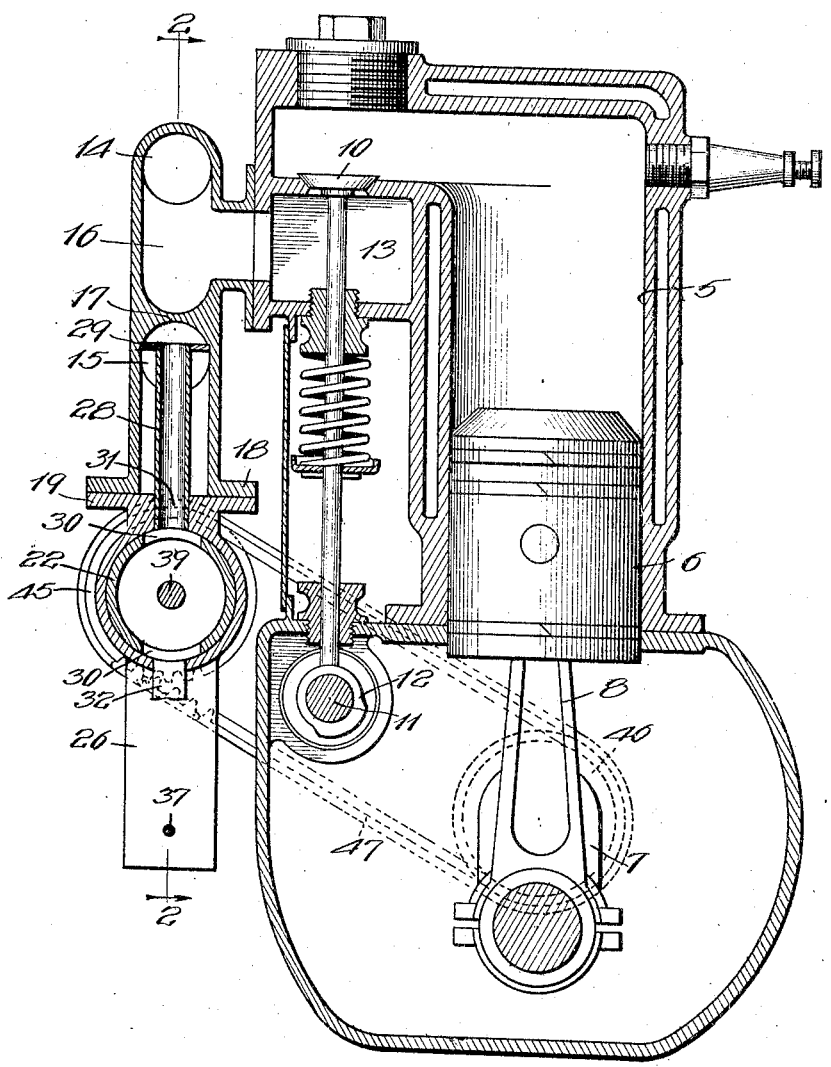
Figure 1 is a vertical section of an engine embodying the invention.

As shown in Figure 1, the engine embodying my invention has the usual cylinder 5 within which a piston 6 operates. This piston is connected to the crank shaft 7 by means of a suitable connecting rod 8, these parts being of any preferred or the usual construction. The cylinder 5 is provided with the usual intake valve (not shown) and the exhaust valve 10, said valves being suitably actuated by proper cams on the cam shaft 11. The valve 10 is operated by the exhaust cam 12 as is usual in engine construction.

The exhaust pocket 13 communicates with an exhaust manifold 14 and the exhaust manifold is in this case made integral with the intake manifold 15, a pocket 16 in the exhaust manifold being provided to heat the "hot spot" 17 in the intake manifold. The intake manifold is provided with suitable bolting flanges 18 which are adapted to be connected to co-operating flanges 19 of a suitable valve housing 20, this valve housing having a rotary valve member 22 therein co-operating with the ports 23 and 24. The valve member 22 also has a passageway defined by the openings 25 therein so that when the openings 25 are brought in register with the ports 23 and 24 the interior of the intake pipe 15 will communicate thru the air connection 26 with atmosphere.

I have provided a pair of air connections 26 and have formed the valve 22 in double form. Between these ports I have provided another passageway both in the valve casing and in the valve for the admission of liquid fuel to the intake manifold. A relatively small pipe 28 is mounted centrally of the valve casing and extends upward into the intake pipe 15 to a point adjacent the hot spot 17. This pipe 28 bears at its upper end a deflector 29 which deflects the incoming air from the hot spot 17, thereby preserving its efficiency for the heating of the fuel and preventing expansion of the air and consequent loss in volumetric efficiency.

The valve 22 has a passageway 30 which is adapted to register with the ports 31 and 32 to put the pipe 28 in communication with the carburetor connection 33. A carburetor 34 of any usual or preferred construction is attached to the carburetor connection 33, this carburetor being so adjusted as to discharge a relatively high percentage of liquid fuel for a given flow of air thru the same.

In order to control the quantity of mixture drawn into the cylinders for each stroke for controlling the speed of the engine, I have provided common throttling means which regulates the admission of fuel and air simultaneously so that no change in the quality of the mixture for different degrees of throttling occurs. In each one of the atmospheric connections 46 I provide a throttle valve 35 and similarly provide a throttle valve 36 in the carburetor connection, this connection lying in line with the atmospheric connections so that a single throttle shaft 37 may serve as a common mounting for all of the throttles and thus movement of the said shaft 37 jointly controls all of said members in exactly the same degree.

The rotary valve 22 is mounted on a suitable shaft 39 which has suitable bearings, in this case ball bearings 40 and 41 mounted in end plates 42 and 43.

The operation of the mechanism thus far described, is as follows: Assuming that the piston 6 is at the top of its stroke, the next succeeding action is a downward motion which we will assume to be the suction stroke. At this time the exhaust valve 10 is closed and the intake valve, which is not shown, is opened. As the piston 6 moves downwardly, a suction or reduction in pressure is created in the cylinder and in the manifold the valve 22 being at that time substantially in the position as shown in Figure 2 with the port 25 out of register with the ports 23—24 and with the port 30 in register with the ports 31—32 so that the suction which is created in the intake manifold 15 is permitted to operate upon the carburetor 34 to draw a suitable charge of fuel together with sufficient air to atomize same and to project the fuel upwardly thru the pipes 33 and 28 and against the hot spots 17.

After the piston has moved downward about 90 degrees below the top center the rotary valve is moved to uncover the port 25 so that the atmospheric connection is put into communication with the intake manifold 15. The incoming air then passes into the intake pipe, being deflected by the baffle 29 so that it does not strike the hot spot 17 and its efficiency is not affected. The air and the finely divided fuel are then drawn into the engine cylinder the main intake valve and the rotary valve closing after the piston has passed the lower center and compression in the particular cylinder occurs on the upward stroke of the piston. On the succeeding downward stroke of the piston the mixture which is exploded expands and furnishes power. The exhaust valve is opened at approximately 135 degrees past top center and the exhaust valve remains open until the piston again comes to the upper end of the stroke where the exhaust valve is closed and the intake valve opened and the cycle of operations is repeated.

It will be understood that the rotary valve is driven in unison with the main shaft 7 of the engine as by means of the sprockets or gears 45—46 and a connecting chain 47. Other suitable driving means might be provided as a particular connecting means is not of the essence of the invention.

In Figure 5 I have illustrated the preferred form of the invention, as this form provides the refinement of securing a relatively high suction for all engine speeds. Between the valve 22 and the valve casing 20 I provide a rotary sleeve 50 with suitable ports 51 and 52 adapted to register to a greater or less degree with the ports 23—24 and the port 25 thru the valve member 22.

The sleeve 50 is connected to a speed controlled governor 51 which governor operates thru suitable connections to vary the degree of opening of the sleeve 50 for various speeds of the engine. Thus for a relatively low speed the ports 51—52 in the sleeve 50 would be moved partially out of register so that a predetermined degree of suction is caused in the intake 15 regardless of the speed of the engine. Thus the rotation of the sleeve 50 in effect changes the timing of the valves so that a longer period may be devoted to the feeding of fuel and a shorter time to the entry of air or vice versa as may be desired. The speed controlled valve sleeve 50 may control the air connection only, as shown, but as it is within the skill of any ordinary mechanic, I do not consider it invention to control the carburetor connection only, or both air and fuel jointly, and therefore do not limit myself to the exact showing, except in so far as imposed by the appended claims. I believe that I am the first to provide means in the form of a speed controlled valve for maintaining the suction effect substantially constant for all engine speeds. I am aware that heretofore speed controlled valves have been employed for governing the quantity of mixture fed to the engine but the present invention is in no wise similar.

The carburetor herein is not a carburetor in the sense that it carburets the air to form an explosive mixture. It is instead a fuel metering device operated by aspiration. The incoming air which passes thru the carburetor is wholly insufficient to support combustion and is employed for the mechanical dispersing and pulverizing and carrying effect for conveying the liquid fuel into the manifold and particularly for conveying the liquid fuel to the hot spot. The main body of air which is required to support combustion does not enter until the atmospheric connection is opened by the rotary valve 22.

I do not intend to be limited to the details of construction shown and described.

I claim:

1. In combination, an engine cylinder, fuel feeding means, air admission means, a conduit connecting with said cylinder, and a single valve for first connecting said fuel feeding means to said conduit and for subsequently connecting said air admission means to said conduit during the intake stroke in said cylinder.

2. In combination, an engine cylinder having a piston, suction responsive fuel feeding means, an intake manifold, an intake valve controlling the connection between said manifold and said cylinder, air admission means to said manifold, and secondary valve means operable to connect or disconnect said fuel feeding means to said manifold, said secondary valve means operating synchronously with the cyclical operation of said cylinder for first connecting said fuel feeding means to said manifold and for subsequently connecting said air admission means to said manifold during the intake stroke of said piston.

3. In combination, an engine having a combustion cylinder and piston, a conduit connecting with said cylinder, fuel feeding means adapted to discharge into the conduit, air admission means adapted to open into said conduit, valve means operating synchronously with said engine for controlling the communication between said fuel feeding means, said air admission means and the conduit, and means responsive to engine speeds for changing the timing of said valve means for separately controlling the admission of fuel and main air to said conduit.

4. In combination, an engine, mixture producing means therefor comprising a suction responsive fuel feeding device, valve means controlling the operation of said mixture producing means, and a governor driven by the engine shaft, a valve controlled by said governor for restricting the opening through said first valve at low speeds and for increasing the opening at high speeds to maintain a predetermined suction effect upon said mixture producing means.

5. In combination, an engine, an intake pipe for the engine, an exhaust pipe for the engine, said intake and exhaust pipes being brought into proximity to provide a hot spot in the intake pipe, a carburetor, a carburetor connection having a pipe discharging against said hot spot, an atmospheric connection having communication with the intake pipe adjacent the hot spot, a baffle for preventing the air entering by the atmospheric connection from striking the hot spot, and valve means operated synchronously with the cyclical operation of the engine for controlling said atmospheric connection and said carburetor connection.

6. In combination, an engine cylinder, an intake pipe having a hot spot, an atmospheric connection for said pipe, a second pipe discharging upon said hot spot in the intake pipe, a carburetor, a carburetor connection for said second pipe, automatic valve means operated synchronously with the engine for governing said atmospheric connection and said carburetor connection.

7. In combination, an engine cylinder, an intake pipe having a hot spot, an atmospheric connection for said pipe, a second pipe discharging upon said hot spot in the intake pipe, a carburetor, a carburetor connection for said second pipe, automatic valve means operated synchronously with the engine for governing said atmospheric connection and said carburetor connection, and throttle valve mechanism for both of said pipes for controlling the admission thru said carburetor connection and thru said atmospheric connection.

8. In combination, an engine cylinder, an intake pipe for the cylinder, an atmospheric connection for said intake pipe, a carburetor, a carburetor connection for said pipe, valve means for controlling at separated intervals the communication of said connections with said intake pipe, means for operating said valve mechanism synchronously with the cyclical operation of the engine, and means for throttling said carburetor connection and said atmospheric connection in unison.

9. In combination, an engine cylinder having the usual intake valve and intake pipe, a valve housing, a rotary valve in said housing, an atmospheric connection communicating with the housing, a carburetor, a carburetor connection communicating with said housing, said rotary valve having atmospheric ports and carburetor connection ports, means for driving said rotary valve in synchronism with the engine, said ports being arranged to open the carburetor connection during the first part of the intake stroke and to open the atmosphere connection during the latter part of the intake stroke only.

10. In combination, an engine cylinder having the usual intake valve and intake pipe, a valve housing, a rotary valve in said housing, an atmospheric connection communicating with the housing, a carburetor, a carburetor connection communicating with said housing, said rotary valve having atmospheric ports and carburetor connection ports, means for driving said rotary valve in synchronism with the engine, said ports being arranged to open the carburetor connection during the first part of the intake stroke and to open the atmosphere connection during the latter part of the intake stroke only, and throttle means for controlling the atmospheric connection and the carburetor connection in unison.

11. In combination, an engine cylinder having the usual intake valve and intake pipe, a valve housing communicating with said pipe, said valve housing having atmospheric connection ports and carburetor connection ports, a carburetor, a rotary valve in said housing, said valve having passageways adapted to control said ports, a rotary sleeve between the valve and the housing, and speed controlled means operated by the engine for governing the position of said sleeve, said sleeve having ports adapted to register to a greater or less extent with said ports and valve passages.

In witness whereof I hereunto subscribe my name this 25 day of June, A. D. 1919.

DON COLE.